(12) United States Patent
Joseph et al.

(10) Patent No.: US 6,673,277 B1
(45) Date of Patent: Jan. 6, 2004

(54) METHOD OF MANUFACTURING A LIGHT GUIDE

(75) Inventors: Edmond Kenneth Joseph, Burleigh (AU); Robert Jacob Molitoris, Burleigh (AU)

(73) Assignee: Poly Optics Australia Pty, Ltd, Burleigh (AU)

( * ) Notice: Subject to any disclaimer, the term of this patent is extended or adjusted under 35 U.S.C. 154(b) by 0 days.

(21) Appl. No.: 09/700,855

(22) PCT Filed: May 17, 1999

(86) PCT No.: PCT/AU99/00367

§ 371 (c)(1),
(2), (4) Date: Nov. 17, 2000

(87) PCT Pub. No.: WO99/59804

PCT Pub. Date: Nov. 25, 1999

(30) Foreign Application Priority Data

May 18, 1998 (AU) ................................................ PP3570

(51) Int. Cl.[7] ................................................ B29D 11/00
(52) U.S. Cl. .................. 264/1.24; 264/573; 264/40.3; 422/131
(58) Field of Search ................................. 264/1.24, 573, 264/40.1, 40.3; 425/149, 808; 422/131

(56) References Cited

U.S. PATENT DOCUMENTS

| | | | |
|---|---|---|---|
| 4,422,719 A | 12/1983 | Orcutt | |
| 4,806,289 A | 2/1989 | Laursen et al. | 264/1.5 |
| 4,873,030 A | * 10/1989 | Taketani et al. | 264/1.24 |
| 4,984,870 A | 1/1991 | Herbrechtsmeier et al. | |
| 5,221,387 A | 6/1993 | Robbins et al. | 156/85 |
| 5,298,327 A | 3/1994 | Zarian et al. | 428/373 |
| 5,681,611 A | 10/1997 | Yoshikawa et al. | 427/163.2 |
| 5,684,913 A | 11/1997 | Sugiyama et al. | 385/143 |
| 6,251,311 B1 | * 6/2001 | Zarian et al. | 264/1.24 |

FOREIGN PATENT DOCUMENTS

JP          07168028        7/1995

* cited by examiner

*Primary Examiner*—Mathieu D. Vargot
(74) *Attorney, Agent, or Firm*—Llyod W. Sadler (57) ABSTRACT

A method of manufacturing light guide by filling a polymer tube with a monomeric mixture then pressurising and heating the full length of the polymer tube to initiate and maintain polymerisation in the tube. An apparatus for performing the method is also described in which the polymer tube is placed in a reaction vessel and a temperature controlled fluid is circulated to regulate the temperature in the vessel.

22 Claims, 12 Drawing Sheets

METHOD OF MANUFACTURING A LIGHT GUIDE

FIELD OF THE INVENTION

This invention relates to a method of manufacturing a polymer light guide. In particular, it relates to a method that produces a light guide that is essentially free from voids and gas bubbles.

BACKGROUND TO THE INVENTION

Production of light guides from polymeric materials is well known. A variety of different techniques for their production may be found in the literature.

Reference may be had to U.S. Pat. No. 4,422,719 in the name of Orcutt. Orcutt describes a flexible thermosetting polymer produced as a light guide. The polymer composition is disclosed as 60–90% allyl diglycol carbonate (CR39), a 1.5 to 3% solution of isopropylpercarbonate (IPP) and the balance methyl methacrylate. The monomer solution is polymerised in a hot liquid bath for a period of 12 to 24 hours. Orcutt discloses that the core material may be under catalysed in order for it to remain flexible.

Reference may also be had to U.S. Pat. No. 5,298,327 in the name of Zarian. Zarian describes a plastic light conduit of cross-link polymer material having good light transmitting characteristics. Also disclosed is a method of manufacturing the light conduit involving progressive heating of reactive monomer mixture in a tube which is submerged in a progressive reactor utilizing cold oil to maintain a cold, non-reacting zone, and hot water to create a hot zone that causes reaction, while simultaneously carrying away the excess exothermic heat of reaction.

Although the Zarian method may produce polymer light guides of good quality that are free from bubbles and voids it is a slow technique. Furthermore, the progressive nature of the method places a practical limit on the length of light guide that can be produced due to difficulties in handling tubes filled with unreacted liquid monomer.

OBJECT OF THE INVENTION

It is an object of the present invention to provide a method of manufacturing a polymer light guide that substantially alleviates the deficiencies in the prior known methods.

DISCLOSURE OF THE INVENTION

In one form, although it need not be the only or indeed the broadest form,.the invention resides in a method of manufacturing a polymer light guide including the steps of:
  producing a monomeric mixture from amounts of monomer, initiator and cross-linking agent;
  forming a polymer tube into a coil;
  filling the coil of polymer tube with the monomeric mixture;
  pressurising and heating the full length of the polymer tube to conditions appropriate to initiate and maintain polymerisation of the mixture.

In preference, the method further includes the step of stirring the monomeric mixture to form a uniform mixture. The mixture is preferably allowed to degas for a period of time. The period of time is typically in the order of 30 minutes.

The method may further include the step of purification of the monomer before producing the monomeric mixture. Purification may be by vacuum distillation, ion exchange filtration or other suitable process.

The method may also include the step of pre-expanding the polymer tube by pressurising the tube prior to filling the tube with the monomeric mixture.

The polymer tube is preferably greater than 100 metres in length. More preferably the polymer tube is greater than 300 metres in length. In addition it is preferable that the coil of polymer tubing is formed by winding polymer tube onto a drum.

The step of pressurising and heating the full length of the polymer tube may suitably be conducted in two or more steps in which the mixture in the polymer tube is subjected to a first set of temperature and pressure conditions followed by second and further sets of temperature and pressure.

The conditions appropriate for initialisation of polymerisation include a pressure in the range 10 kpa to 2000 kpa.

The temperature is preferably maintained in a range between the storage temperature of the mixture and a temperature whereby the half life of the initiator used is between 10 and 20 hours. The temperature of the mixture is preferably increased to a value whereby the half life of the initiator used, is between 5 and 10 hours. The temperature may be further increased to a value whereby the half life of the initiator used is between 30 minutes and 60 minutes to obtain a desired final cure.

In a further form the invention resides in an apparatus suitable for manufacturing a polymer light guide, said apparatus comprising,
  a means for supporting a coil of polymer tube;
  a reaction vessel for holding a polymer tube fillable with a monomeric mixture;
  pressure means connectable to the polymer tube for applying pressure to the tube before and after filling said tube with said monomeric mixture;
  a temperature controlled fluid, circulable through the reaction vessel so as to control the temperature within the reaction vessel;
  a pump for circulating the temperature controlled fluid; and
  temperature control means for adjusting the temperature of the temperature controlled fluid.

In preference the polymer tube is completely immersed in the fluid within the reaction vessel. The reaction vessel may be a room. The means of supporting the coil of polymer tube may be a drum.

The fluid may conveniently be water although other fluids, such as oil, will be necessary if high temperature initiators are used. Air may also be used as the fluid for temperature control. In the case of air, the pump is conveniently a fan. Air will be the fluid of choice when the reaction vessel is a room.

The apparatus may further include a filling means. The filling means suitably comprises a pressure vessel containing a reservoir of monomeric mixture, a bleeding tank for receiving excess monomeric mixture and pressure supply means for supplying pressure to the pressure vessel to force monomerix mixture through the polymer tube when connected between the pressure vessel and the bleeding tank.

Polishing means may also be incorporated into the apparatus for polishing the optical entrance and exit faces of the polymer light guides produced in the apparatus.

BRIEF DETAILS OF THE DRAWINGS

To assist in understanding the invention preferred embodiments will now be described with reference to the following figures in which.

DETAILED DESCRIPTION OF THE DRAWINGS

The specific embodiments described herein are by way of example only and do not define the full range of possible formulations falling within the scope of the invention. In the drawings, like reference numerals refer to like parts.

A flexible light guide is formed by polymerising a mixture of monomers, multi functional cross-linking agents, UV stabilisers/absorbers and initiators.

The monomer is an alkyl acrylate, alkyl methacrylate or any vinyl monomer, which may be selected from the following list (although not limited to the compounds in the list).

methyl methacrylate
    butyl methacrylate
    decyl methacrylate
    ethyl acrylate
    butyl acrylate
    2-ethylhexyl acrylate
    styrene The multifunctional cross-linking agent may be selected from the following list (although not limited to the compounds in the list).

allyl diglycol carbonate (CR39)
    diallyisophthalate
    divinyl benzene
    triethyl glycol diacrylate
    ethylene diacrylate
    diallyl carbonate The initiators may be selected from the following list (although not limited to the compounds in the list).

di-isopropyl peroxydicarbonate (IPPC)
    dilauroyl peroxide (LP)
    dibenzoyl peroxide (BPO)
    tert-butyl peroxy 2-ethylhexanoate (TBPEH)
    1,1-di((tert-butylperoxy)3,3,5 trimethyl cyclohexane) (TMCH)
    dicumyl peroxide (DCUP)
    di(tert-butyl)peroxide (DTBP)
    di(2-ethylhexyl)peroxydicarbonate (EHPC)
    dicyclohexyl peroxydicarbonate (CHPC)
    sec-butyl peroxydicarbonate (SBP)
    n-propyl peroxydicarbonate (NBP)
    isopropyl peroxide
    methyl ethyl ketone peroxide Ultraviolet stabilisers/absorbers may also be added to the monomeric mixtures according to the method disclosed in our co-pending application number PP3321 titled IMPROVED LIGHT GUIDE.

The polymer tubes filled with monomeric mixture may be formed from suitable fluoropolymers selected from the following list (although not limited to the list).

Poly-tetra-fluoro-ethylene (PTFE)
    Poly-chloro-tri-fluoro-ethylene (PCTFE)
    TFE and perfluorovinylether copolymer (PFA)
    TFE and hexa-fluoro-propylene copolymer (FEP)
    Poly-vinyliden-fluoride (PVDF/PVF2)
    TFE and ethylene copolymer (ETFE)
    CTFE and ethylene copolymer (ECTFE)

The polymer tubes may also be formed from non-fluoropolymers such as polyethylene teraphthalate (PET).

The following five polymers were produced for testing purposes. The polymers were produced in an FT-IR machine prior to the preparation of the light guide in the reaction vessel so that polymerisation profiles could be obtained.

EXAMPLE 1

A mixture was formed comprising 50 parts by weight of distilled MMA, 1 part by weight of BPO (dibenzoyl peroxide) and 50 parts by weight of CR39. The mixture was stirred for 30 minutes with a magnetic stirrer to obtain a uniform mixture, then degassed for a further 30 minutes.

Figure 1:
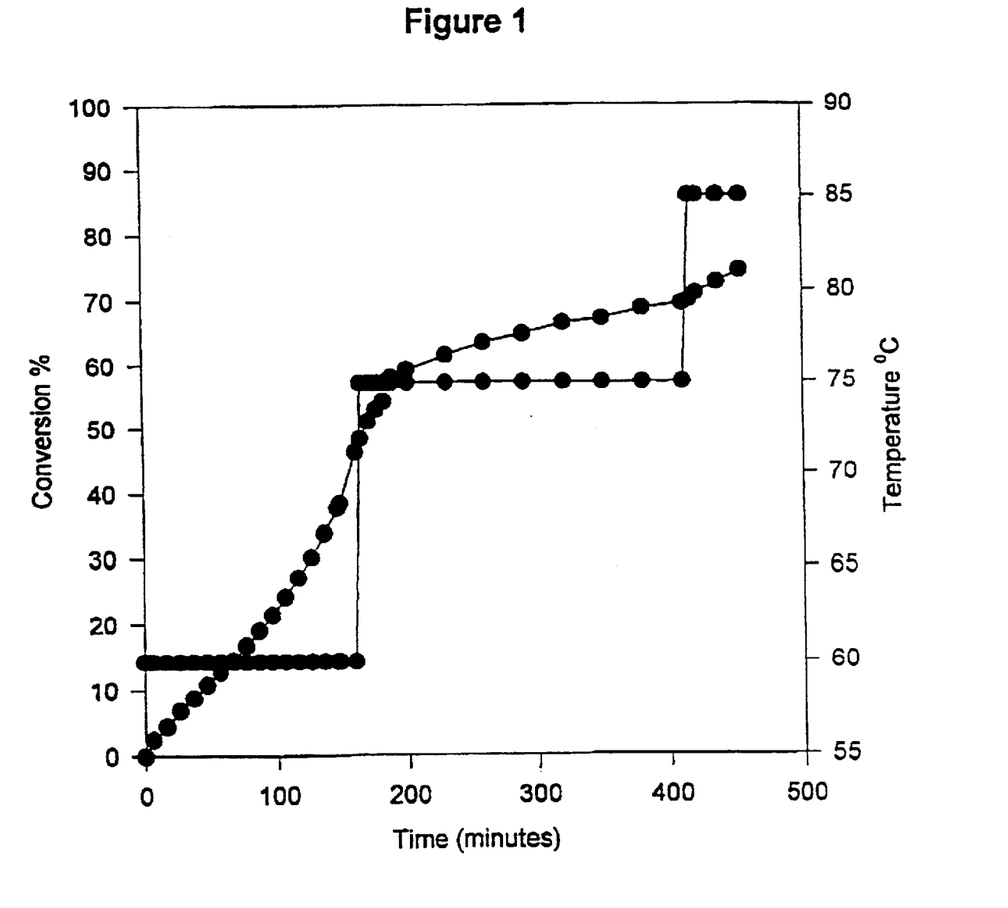
FIG. 1 is a graph of the polymerisation profile of a first light guide.

An FEP tube was immersed in a bath of water at 60° C. and the tube filled with the liquid mixture. The tube was pressurised to 300 kpa. After 3 hours the temperature of the bath was increased to 75° C. and left for a further 7 hours. At the end of this time the pressure was reduced to ambient and the water bath was heated to 85° C. and left for 30 minutes. The polymerisation profile is shown in FIG. 1.

EXAMPLE 2

A mixture was formed comprising 50 parts by weight of distilled MMA, 1 part by weight of lauroyl peroxide and 50 parts by weight of CR39. The mixture was stirred for 30 minutes with a magnetic stirrer to obtain a uniform mixture, then degassed for a further 30 minutes.

Figure 2:
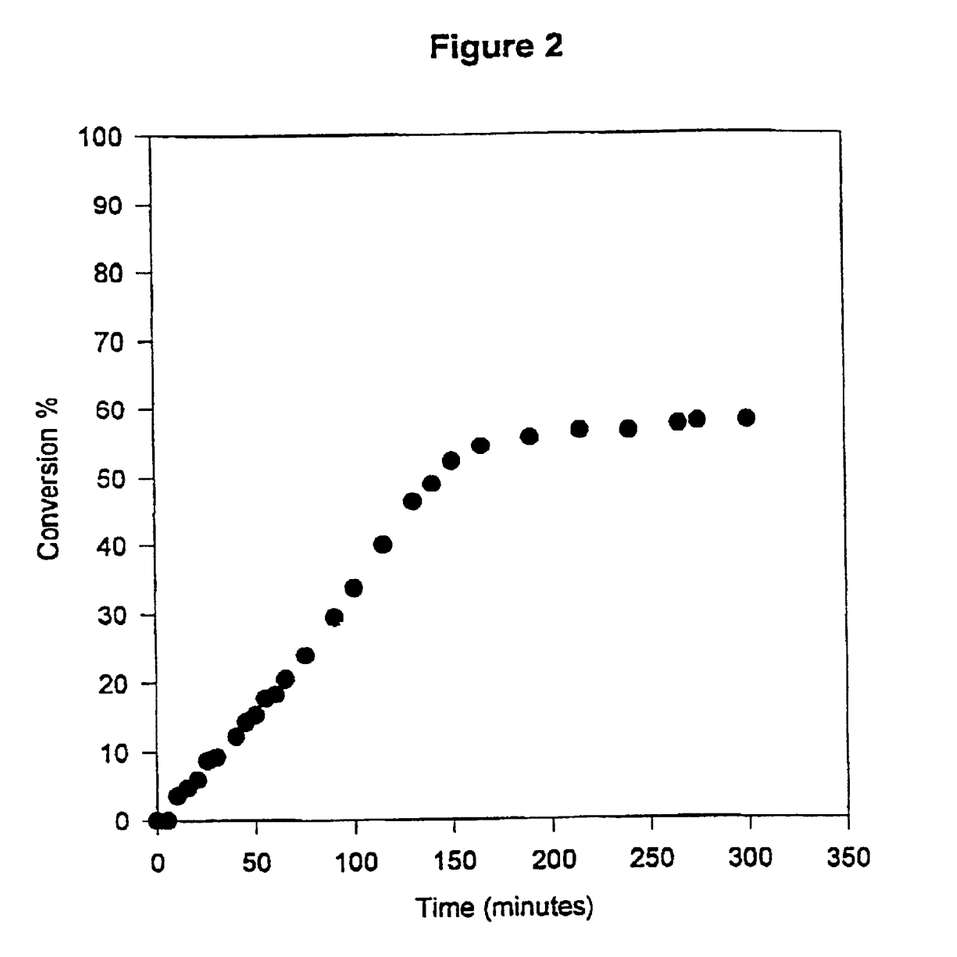
FIG. 2 is a graph of the polymerisation profile of a second light guide.

An FEP tube was immersed in a bath of water at 60° C. and the tube filled with the liquid mixture. The tube was pressurised to 500 kpa. After 6 hours the pressure was reduced to ambient and the polymerisation was left to continue for 12 hours. The polymerisation profile is shown in FIG. 2.

EXAMPLE 3

A mixture was formed comprising 50 parts by weight of distilled MMA, 1 part by weight of BPO and 50 parts by weight of distilled butyl methacrylate. The mixture was stirred for 30 minutes with a magnetic stirrer to obtain a uniform mixture, then degassed for a further 30 minutes.

Figure 3:
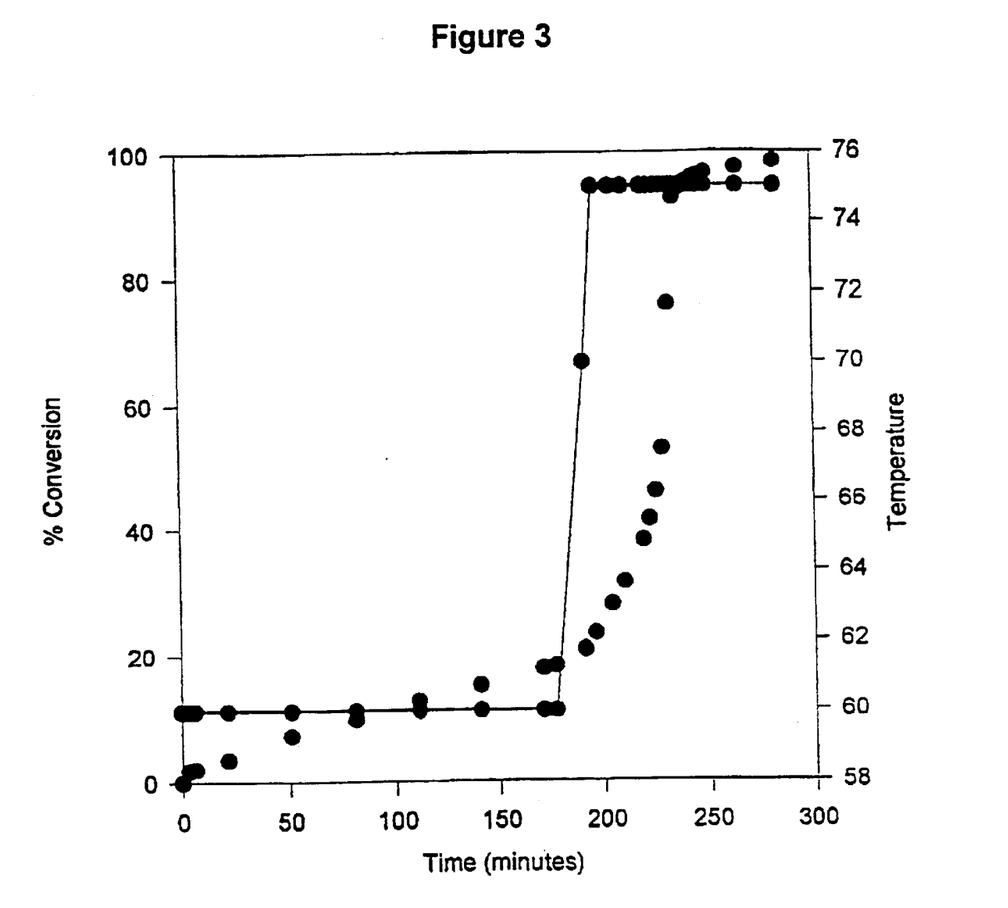
FIG. 3 is a graph of the polymerisation profile of a third light guide.

A PFA tube was immersed in a bath of water at 75° C. and the tube was pre-expanded at a pressure of 550 kpa for 60 minutes. The temperature was reduced to 60° C. and the pressure reduced to ambient. The tube was then filled with the liquid mixture and pressurised to 100 kpa. After 3 hours the temperature of the bath was increased to 75° C. and left for a further 1 hour. At the end of this time the pressure was reduced to ambient and left for a further 30 minutes. The polymerisation profile is shown in FIG. 3.

EXAMPLE 4

A mixture was formed comprising 45 parts by weight of distilled MMA, 1 part by weight of BPO, 5 parts by weight of distilled divinyl benzene and 45 parts by weight of distilled 2EHA. The mixture was stirred for 30 minutes with a magnetic stirrer to obtain a uniform mixture, then degassed for a further 30 minutes.

Figure 4:
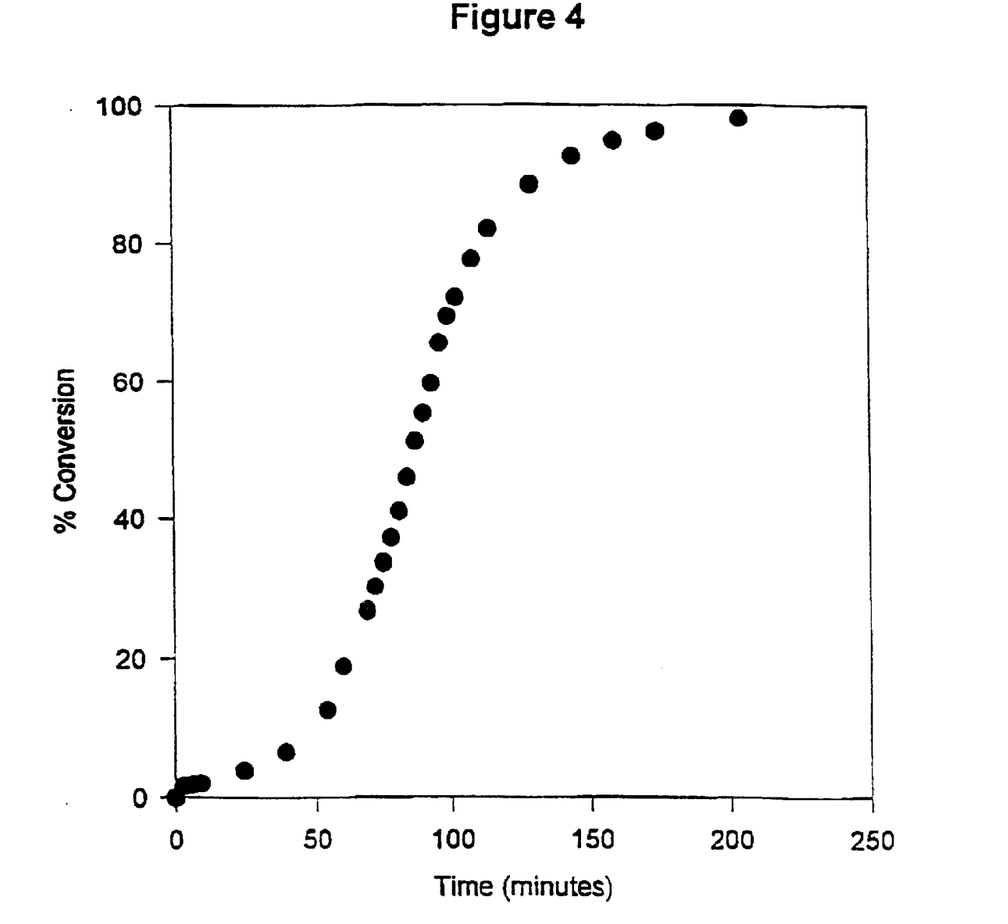
FIG. 4 is a graph of the polymerisation profile of a fourth light guide.

An FEP tube was immersed in a bath of water at 75° C. and the tube was pre-expanded at a pressure of 500 kpa for 30 minutes. At the end of this time the pressure was reduced to ambient and the water bath was allowed to cool to 60° C. The tube was filled with the liquid mixture. The tube was then pressurised to 100 kpa and left for 200 minutes. The polymerisation profile is shown in FIG. 4.

EXAMPLE 5

A mixture was formed comprising 50 parts by weight of distilled vinyl acetate, 1 part by weight of di(2-ethylhexyl) peroxydicarbonate and 50 parts by weight of CR39. The mixture was stirred for 30 minutes with a magnetic stirrer to obtain a uniform mixture, then degassed for a further 30 minutes.

Figure 5:
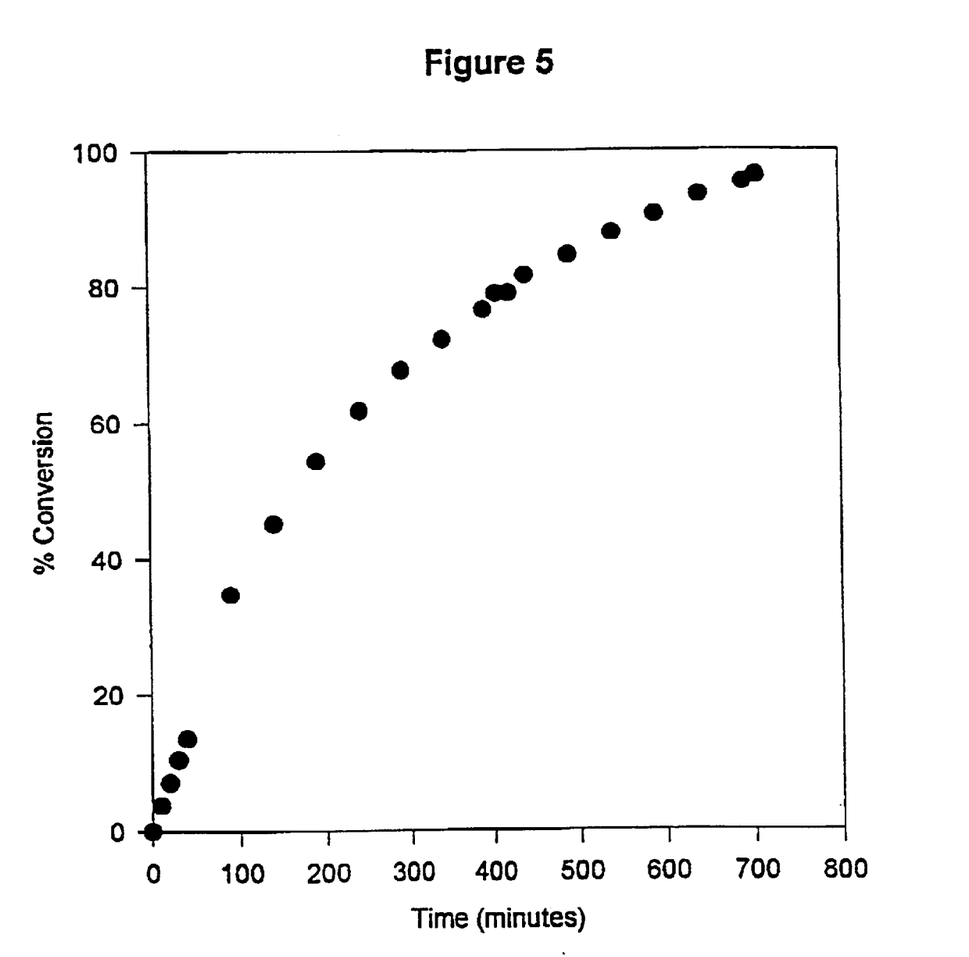
FIG. 5 is a graph of the polymerisation profile of a fifth light guide.

An FEP tube was immersed in a bath of water at 75° C. and pre-expanded at a pressure of 500 kpa for 60 minutes. The temperature was reduced to 50° C. and the pressure was reduced to ambient. The tube was then filled with the liquid mixture, pressurised to 100 kpa and allowed to continue polymerisation for 750 minutes. The polymerisation profile is shown in FIG. 5.

The following two procedures exemplify variations to the procedures described above fr/or producing polymer light guides in extended lengths.

EXAMPLE 6

A mixture was formed comprising 80 parts by weight of distilled MMA, 1 part by weight of BPO (dibenzoyl peroxide) and 20 parts by weight of CR39. The mixture was stirred for 20 minutes with a magnetic stirrer to obtain a uniform mixture.

Figure 12:
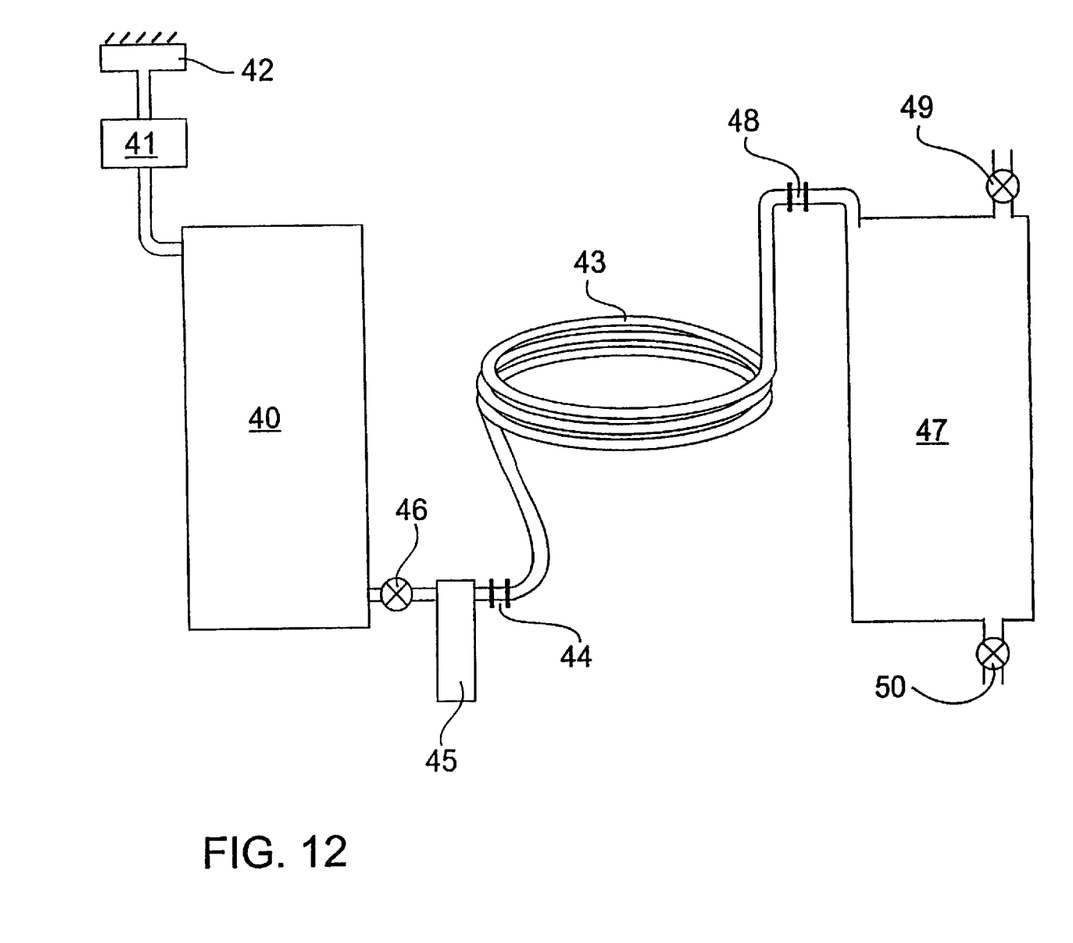
FIG. 12 is a diagram of a filling apparatus.

A 420 metre long FEP tube in coil form was immersed in a bath of water at 60° C. and the tube filled with the liquid mixture using the filling process described below with reference to FIG. 12. The tube was pressurised to 300 kpa. After 2 hours the temperature of the bath was increased to 70° C. and left for a further 2 hours. At the end of this time the pressure was reduced to ambient and the product removed from the bath.

EXAMPLE 7

A mixture was formed comprising 50 parts by weight of distilled MMA, 1 part by weight of DCUP (dicumyl peroxide) and 50 parts by weight of CR39. The mixture was stirred for 30 minutes with a magnetic stirrer to obtain a uniform mixture, then degassed for a further 30 minutes.

A 150 metre long FEP tube was placed in coil form in a chamber in a vertical drum at 80° C. and the tube filled with the liquid mixture using the filling apparatus described below with reference to FIG. 12. The tube was pressurised to 70 kpa. After 2 hours the temperature of the chamber was increased to 120° C. and left for a further 6 hours. At the end of this time the pressure was reduced to ambient and the product removed from the chamber.

The polymer light guides resulting from the above examples were tested for voids and bubbles. The tests showed that all the light guides were essentially void and bubble free. But the light guide in Example 2 and Example 4 were slightly opaque.

Figure 6:
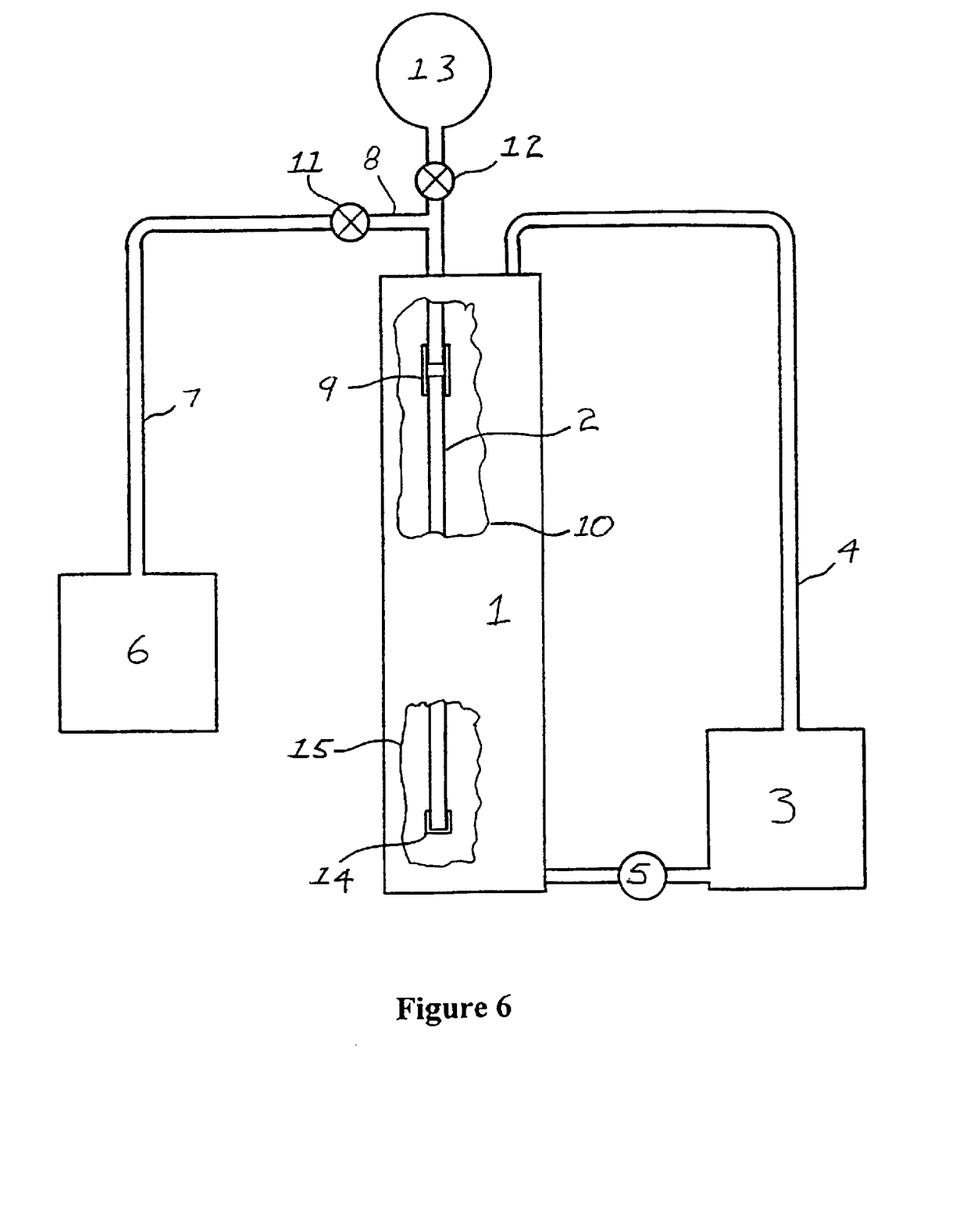
FIG. 6 is a diagram of a vertical reactor for working the method.

An apparatus suitable for performing the method is shown schematically in FIG. 6. The apparatus comprises a vertical reaction vessel 1 in which a fluoropolymer tube 2 is located. Hot water, or other fluid such as oil or air, is circulated from a temperature controlled reservoir 3, through lines 4 by pump 5. The temperature of the circulating fluid determines the temperature within the reaction vessel 1.

The inventors have found that control of the temperature in the reaction vessel is easiest with the flowing arrangement described. However, a temperature controlled static bath could also be employed.

Pressure can be applied to the tube 2 by pressure supply means 6, which may be hydraulic or pneumatic. Pressure supply line 7 connects the pressure supply means 6 to the tube 2 via manifold 8 and coupling 9 (seen in cut away portion 10). The tap 11 in the manifold 8 can isolate the tube 2 from the pressure supply means 6. The tap 12 can then be opened to allow monomeric mixture to flow from reservoir 13 into the tube 2. The other end of tube 2 is conveniently closed by plug 14 as shown in cut away portion 15.

Although the apparatus is shown with a single tube 2 it will be appreciated that multiple tubes can be processed simultaneously by appropriate arrangement of the manifold 8. Furthermore, a number of reactors can be operated together for mass manufacture of optical light guides.

Figure 7:
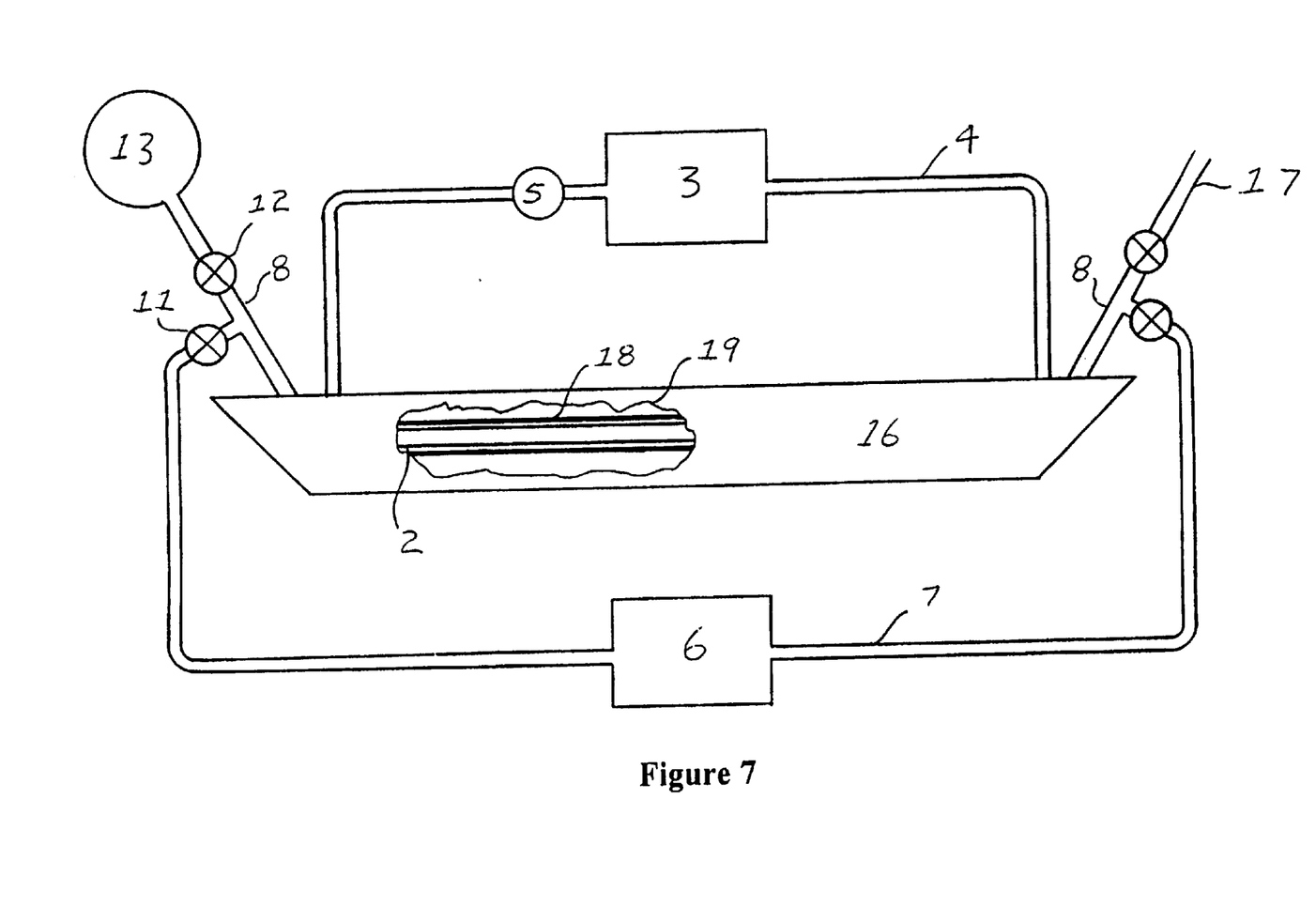
FIG. 7 is a diagram of a horizontal reactor for working the method.

A further apparatus suitable for performing the method is shown in FIG. 7. In this embodiment the reaction vessel 16 is a double-ended horizontal reactor. Water is circulated from reservoir 3 by pump 5 as in the first embodiment. In the embodiment of FIG. 7 pressure is applied to the tube 2 from both ends. A manifold 8 is provided at both ends of the reactor thereby allowing monomeric mixture to be sucked into the tube 2 from reservoir 13 by application of suction to line 17.

A support tube 18 may be fitted within the reaction vessel 16 as shown in cut away portion 19. The support tube 18 provides a limit to the expansion of tube 2 when it is being pre-expanded or filled with monomeric mixture. The support tube 18 reduces the possibility of the tube 2 splitting due to the pressure applied.

Figure 8:
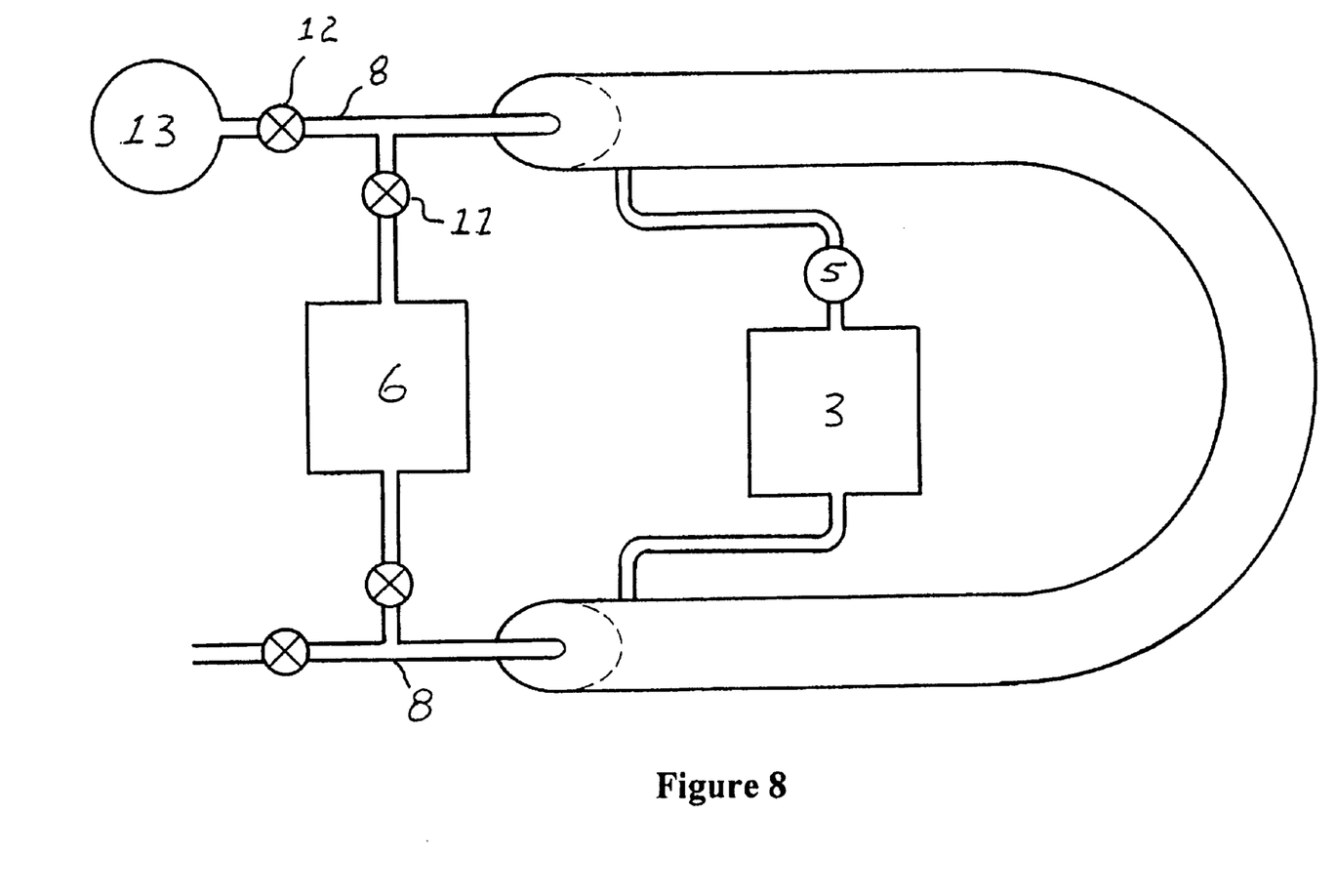
FIG. 8 is a diagram of a 'U' shaped reactor for working the method.
Figure 9:
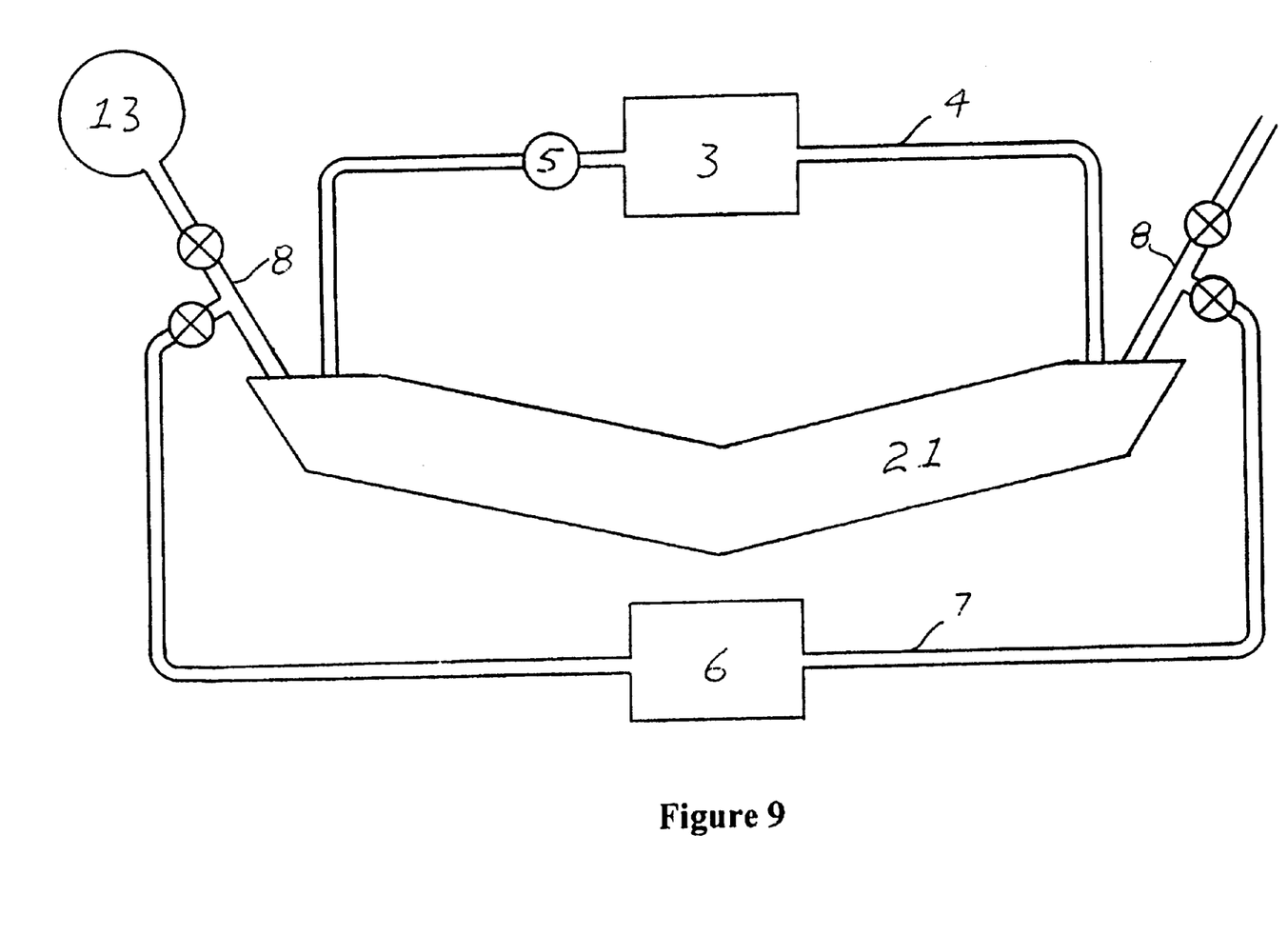
FIG. 9 is a diagram of a double ended reactor for working the method.

A still further reaction vessel 20 in the shape of a 'U' is shown in FIG. 8. FIG. 9 shows a double ended reaction vessel 21. The arrangement of temperature control, pressure control and filling of the tube for the embodiments of FIG. 8 and FIG. 9 are similar to the arrangement described for the vertical 1 and horizontal 16 reaction vessels. Each reaction vessel 1, 16, 20 and 21 is suitable for working the method described herein, however the double ended and 'U' shaped reaction vessels have particular advantage in compact design where longer lengths of light guide are required. It will be appreciated that the variations described above can be applied to any of the specific reaction vessel embodiments or to other reaction vessel designs that will be evident to persons skilled in the relevant art.

Figure 10:
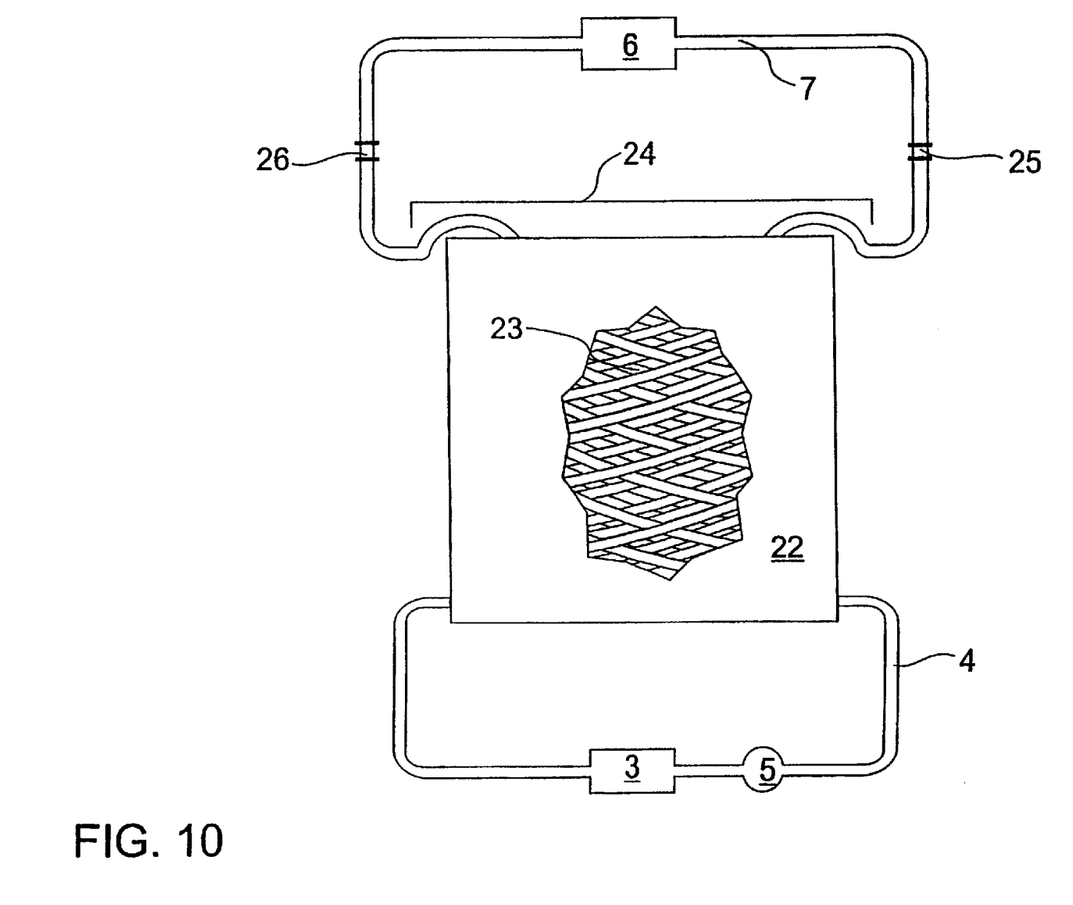
FIG. 10 is a diagram of a reaction chamber for production of long coils of light guide.

Very long polymer light guides can be produced using the reaction chamber shown in FIG. 10. The reaction chamber 22 is a drum in which a coil of polymer tube 23 is placed. The coil may conveniently be wound on a wooden drum. A lid 24 is placed on the chamber 22 to assist with temperature control and to protect against the effects of splitting of the tube when under pressure. The polymer tube 23 may be pre-filled with monomeric mixture before being placed in the chamber 22. To facilitate pre-filling, each end of the tube is fitted with a stop valve connector 25, 26. Pre-filling may be performed using the apparatus shown in FIG. 12 and described below.

The coil of polymer tube 23, pre-filled with monomeric mixture, is pressurized during processing by pressure supply means 6 via pressure supply line 7. Each end of pressure supply line 7 is fitted with a quick connector that receive stop valve connectors 25, 26. Production of the polymer light guide proceeds according to one of the examples given above, or a similar process. The apparatus shown in FIG. 10 has been used to produce polymer light guides up to 500 metres in length.

Figure 11:
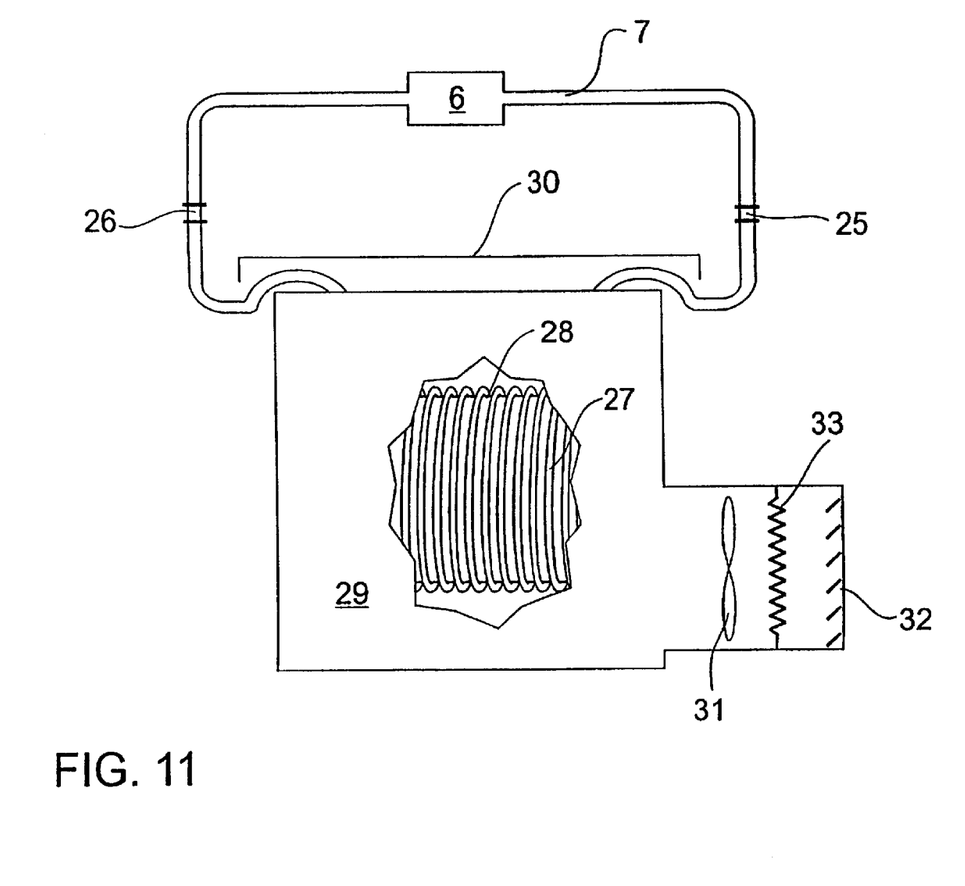
FIG. 11 is a diagram of a reaction chamber for production of long coils of light guide on a drum.

A variation on the apparatus of FIG. 10 is shown in FIG. 11. In this case the coil of polymer tube 27 is kept on a drum 28. Typically, 500 metre lengths of polymertube are commercially available on lightweight, cardboard drums. The drum 28 and tube 27 are located in a vertical chamber 29. As with the apparatus of FIG. 10, the ends of the tube 27 exit the chamber and are fitted with quick connect stop valves 25, 26. The tube 27 may be pressurized during polymerisation by pressure supply means 6. A lid 30 may be fitted to the chamber.

In the embodiment of FIG. 11, temperature control in the chamber is achieved by circulation of temperature controlled air. A fan 31 draws ambient air through filter 32 into the chamber 29. The air exits the chamber through gaps between the lid and the body of the chamber. Exit vents can be formed in the lid 30 if required. A heater 33 is used to heat the air above ambient temperature. The heater 33 is thermostatically controlled to regulate the temperature in the chamber.

As mentioned above, the fluoropolymer tube may be pre-filled with monomeric solution or filled in-situ in the reaction vessel or chamber. A suitable apparatus for filling the tube with monomeric mixture is shown in FIG. 12. A pressure vessel 40 is filled with a monomeric mixture produced according to one of the recipes described above, or a similar recipe. Pressure supply means 41 applies pressure to the pressure vessel 40 thereby pressurizing the monomeric mixture. Pressure supply means 41 may suitably be an air compressor however a filter 42 is desirable to avoid contamination of the monomeric mixture in the pressure vessel 41.

A coil of polymer tube 43 is connected to the pressure vessel 40 with a quick connect stop valve 44. A filter 45 may be fitted to the outlet of the pressure vessel 40 to remove any contaminants. The tap 46 is opened to commence filling of the tube 43.

The other end of the coil 43 is connected to a bleeding tank 47 with another quick connect stop valve 48. Monomeric mixture is flowed through the coil and collected in the bleeding tank until any air in the tube is cleared. A vent 49 is open to atmosphere. When the tube has been satisfactorily filled the vent 49 is closed.

The monomeric mixture in the tube can be pressurised by applying pressure from pressure supply means 41. Pressure can be applied to both ends of the tube by applying pressure to the vent 49 in the bleeding tank 47. Once the tube has been disconnected from the filling apparatus, the monomeric mixture in the bleeding tank 47 can be collected from drain 50 and reused.

If necessary the filling procedure can be repeated a number of times until the tube is well filled without voids, air bubbles or contaminants.

The polymer light guides produced by the methods and apparatus described above provide good light transmission properties without further processing. If the optical entrance and exit faces become damaged or contaminated, a new face can be formed by cutting the light guide using a sharp knife. The inventors have found that a clean cut provides good transmission properties for most applications.

Improved transmission properties can be obtained by polishing the entrance and exit faces. A four step process has been found to be most effective. Initially a new face is cut, then a course wet and dry paper is used to flatten and square the face. A fine grade polishing slurry is used to smooth the surface by removing any scratches or imperfections. The face is buffed with a buffing pad until smooth and flat. A surprisingly good quality surface is obtained for the polymer light guide using this process.

The inventors have found that polymer light guides can be made in long lengths with good transmission properties using the methods and apparatus herein described.

Throughout the specification the aim has been to describe the preferred embodiments of the invention without limiting the invention to any one embodiment or specific collection of features.

What is claimed is:

1. A method of manufacturing a polymer light guide including the steps of:
   producing a monomeric mixture from amounts of monomer, initiator and cross-linking agent;
   forming a polymer tube into a coil that is wound onto a drum, wherein the length of the polymer tube is greater than 100 meters;
   filling the coil of polymer tube with the monomeric mixture; and pressurising and heating the full length of the polymer tube to conditions appropriate to initiate and maintain polymerisation of the mixture.

2. The method of claim 1 wherein the length of the polymer is greater than 300 metres.

3. The method of claim 1 further including the step of stirring the monomeric mixture to form a uniform mixture.

4. The method of claim 1 wherein the mixture is allowed to degas for a period of time.

5. The method of claim 4 wherein the period of time is in the order of 30 minutes.

6. The method of claim 1 further including the step of purification of the monomer before producing the monomeric mixture.

7. The method of claim 6 wherein purification is by vacuum distillation or ion exchange filtration.

8. The method of claim 1 further including the step of pre-expanding the polymer tube by pressurising the tube prior to filling the tube with the monomeric mixture.

9. The method of claim 1 wherein the step of pressurising and heating the full length of the polymer tube is conducted in two or more steps In which the mixture in the polymer tube is subjected to a first set of temperature and pressure conditions followed by second and further sets of temperature and pressure.

10. The method of claim 1 wherein conditions appropriate for initialisation of polymerisation include a pressure in the range 10 pa to 2000 kpa.

11. The method of claim 1 wherein conditions appropriate for maintaining polymerisation include a temperature maintained in a range between the storage temperature of the mixture and a temperature whereby the half life of the initiator used is between 10 and 20 hours.

12. The method of claim 11 wherein the temperature of the mixture is preferably increased to a value whereby the half life of the Initiator used is between 5 and 10 hours.

13. The method of claim 11 wherein the temperature is further increased to a value whereby the half life of the Initiator used s between 30 minutes and 80 minutes to obtain a desired final cure.

14. An apparatus suitable for manufacturing a polymer light guide, said apparatus comprising:
   a coil of polymer tube supported by a drum wherein the length of the polymer tube is greater than 100 meters;
   a reaction vessel for holding the coil of polymer tube, wherein the polymer tube is fillable with a monomeric mixture;
   pressure means connectable to the polymer tube for applying pressure to the full length of said polymer tube before and after filling said tube with said monomeric mixture;
   a temperature controlled fluid, circulable through the reaction vessel so as to control the temperature within the reaction vessel;
   a pump for circulating the temperature controlled fluid; and
   temperature control means for adjusting the temperature of the temperature controlled fluid.

15. The apparatus of claim 14 wherein the polymer tube is completely immersed in the fluid within the reaction vessel.

16. The apparatus of claim 14 wherein the reaction vessel is a room holding the drum.

17. The apparatus of claim 14 wherein the fluid is selected from water, oil or air.

18. The apparatus of claim 14 further including a filling means.

19. The apparatus of claim 18 wherein the filling means comprises a pressure vessel containing a reservoir of monomeric mixture, a bleeding tank for receiving excess monomeric mixture and pressure supply means for supplying pressure to the pressure vessel to force monomeric mixture through the polymer tube when connected between the pressure vessel and the bleeding tank.

20. The apparatus of claim 14 further including polishing means for polishing the optical entrance and exit faces of the polymer light guides produced in the apparatus.

21. A method of manufacturing a polymer light guide of lengths greater than 100 metres, said polymer light guide having a polymeric core within a polymer tube having a lower refractive index than the polymer core, the method including the steps of:
   producing a monomeric mixture from amounts of monomer, initiator and cross-linking agent;
   stirring the monomeric mixture until a uniform monomeric mixture is obtained;
   filling a polymer tube of greater than 100 metres length with the uniform monomeric mixture, said polymer tube being wound on a drum so as to form a coil;
   placing the polymer tube filled with uniform monomeric mixture in a reaction chamber at a first temperature;
   connecting the polymer tube to a pressure source and pressurising the full length of the polymer tube to a first pressure; and
   subjecting the polymer tube to further temperature and pressure conditions, by changing the temperature in the reaction chamber and changing the pressure of the pressure source, until the uniform monomeric mixture has polymerised to a desired degree.

22. The method of claim 21 wherein said reaction chamber is maintained at ambient pressure.

* * * * *